United States Patent
Ito et al.

(10) Patent No.: US 10,774,468 B2
(45) Date of Patent: *Sep. 15, 2020

(54) TREATMENT AGENT FOR IMAGE RECORDING, SET OF INK AND TREATMENT AGENT FOR IMAGE RECORDING, AND RECORDING METHOD

(71) Applicant: Brother Kogyo Kabushiki Kaisha, Nagoya-shi, Aichi-ken (JP)

(72) Inventors: Shinpei Ito, Nagoya (JP); Yasuhiro Taga, Kani (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/269,019

(22) Filed: Feb. 6, 2019

(65) Prior Publication Data

US 2019/0301085 A1  Oct. 3, 2019

(30) Foreign Application Priority Data

Mar. 30, 2018  (JP) ................................ 2018-070305

(51) Int. Cl.
*D06P 1/44* (2006.01)
*C09D 11/54* (2014.01)
(Continued)

(52) U.S. Cl.
CPC ............. *D06P 1/445* (2013.01); *B41J 2/2114* (2013.01); *C09D 11/54* (2013.01); *D06P 1/5285* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 5,609,671 A  3/1997  Nagasawa
5,837,045 A  11/1998  Johnson et al.
(Continued)

FOREIGN PATENT DOCUMENTS

JP  H01-118583 A  5/1989
JP  H08-003498 A  1/1996
(Continued)

OTHER PUBLICATIONS

Propylene Glycol (CAS# 57-55-6) Safety Data Sheet (Creation date: Nov. 19, 2009; Revision Date: Mar. 19, 2019; Revision 7) ThermoFisher Scientific pp. 1-6 (Year: 2009).*

(Continued)

*Primary Examiner* — Manish S Shah
(74) *Attorney, Agent, or Firm* — Banner & Witcoff, Ltd.

(57) ABSTRACT

There is provided a treatment agent for image recording including: a cationic polymer emulsion; and a water-soluble organic solvent including a glycol-based water-soluble organic solvent of which boiling point is not more than 200° C. The treatment agent satisfies the following condition (1): $20 \leq A \leq 60$. In the condition (1), A: a content amount (% by mass) of the glycol-based water-soluble organic solvent, of which boiling point is not more than 200° C., in an entire amount of the treatment agent for image recording.

19 Claims, 4 Drawing Sheets

(51) Int. Cl.
- *D06P 1/52* (2006.01)
- *D06P 5/30* (2006.01)
- *D06P 1/651* (2006.01)
- *B41J 2/21* (2006.01)
- *C09D 11/328* (2014.01)

(52) U.S. Cl.
CPC ............ *D06P 1/65118* (2013.01); *D06P 5/30* (2013.01); *C09D 11/328* (2013.01)

(58) Field of Classification Search
CPC ...... B41J 2/1755; B41J 2/2144; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41M 5/0011; B41M 5/0017; B41M 5/0023; B41M 5/0047; B41M 7/00; B41M 7/0072; B41M 5/52; B41M 5/5218; B41M 5/5227; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033

See application file for complete search history.

(56) References Cited

U.S. PATENT DOCUMENTS

| | | | |
|---|---|---|---|
| 8,016,404 | B2 | 9/2011 | Kato et al. |
| 2003/0064206 | A1* | 4/2003 | Koyano ............... B41M 5/0017 428/195.1 |
| 2004/0204535 | A1* | 10/2004 | Confalone ........... B41M 5/5245 524/543 |
| 2006/0201380 | A1 | 9/2006 | Kowalski et al. |
| 2007/0100023 | A1 | 5/2007 | Burns et al. |
| 2007/0100024 | A1 | 5/2007 | Gu et al. |
| 2008/0241398 | A1 | 10/2008 | Kato et al. |
| 2009/0229489 | A1 | 9/2009 | Gu |
| 2011/0200751 | A1* | 8/2011 | Yatake ................. B41J 3/4078 427/261 |
| 2017/0058453 | A1 | 3/2017 | Pan et al. |

FOREIGN PATENT DOCUMENTS

| | | |
|---|---|---|
| JP | 2000-513396 A | 10/2000 |
| JP | 2008-524400 A | 7/2008 |
| JP | 2008-246821 A | 10/2008 |
| JP | 2009-515007 A | 4/2009 |
| JP | 2011-025504 A | 2/2011 |
| JP | 2011-515535 A | 5/2011 |
| JP | 2017-517640 A | 6/2017 |

OTHER PUBLICATIONS

Ethylene Glycol (CAS# 107-21-1) Safety Data Sheet (Creation date: Feb. 2, 2010; Revision Date: Jan. 17, 2018; Revision 4) ThermoFisher Scientific pp. 1-7 (Year: 2010).*

* cited by examiner

TREATMENT AGENT FOR IMAGE RECORDING, SET OF INK AND TREATMENT AGENT FOR IMAGE RECORDING, AND RECORDING METHOD

CROSS REFERENCE TO RELATED APPLICATION

The present application claims priority from Japanese Patent Application No. 2018-070305 filed on Mar. 30, 2018 the disclosure of which is incorporated herein by reference in its entirety.

BACKGROUND

Field of the Invention

The present invention relates to a treatment agent for image recording, a set of an ink and a treatment agent for image recording, and a recording method.

Description of the Related Art

There is known a recording method for recording by jetting (discharging) a water-based ink onto a fabric (cloth) by the ink-jet system. The recording method includes, for example, a pre-treatment step of applying a pre-treatment agent to the fabric at an application part of the fabric, and, after jetting the water-based ink onto the application part for the pre-treatment agent, a thermal fixing step of thermally fixing the water-based ink to the fabric (see, for example, Published Japanese Translation of PCT International Publication for Patent Application No. 2017-517640 corresponding to United States Patent Application Publication No. US2017/0058453).

In a case of recording on fabric (cloth) by using a water-based ink for ink-jet recording, there is a demand for excellent water resistance. Further, in a case of using a treatment agent for image recording (hereinafter also referred to as a "treatment agent", in some cases) for the purpose of improving the water resistance, the treatment agent for image recording is required to have an excellent storage stability in a low-temperature storage.

In view of the above situation, an object of the present teaching is to provide a new treatment agent for image recording which is excellent both in the water resistance in the recording on fabric and in the storage stability in the low-temperature storage.

SUMMARY

According to a first aspect of the present teaching, there is provided a treatment agent for image recording including:
a cationic polymer emulsion; and
a water-soluble organic solvent including a glycol-based water-soluble organic solvent of which boiling point is not more than 200° C.,
the treatment agent satisfying the following condition (1):

$$20 \leq A \leq 60 \tag{1}$$

wherein in the condition (1),
A: a content amount (% by mass) of the glycol-based water-soluble organic solvent, of which boiling point is not more than 200° C., in an entire amount of the treatment agent for image recording.

According to a second aspect of the present teaching, there is provided a set usable for recording on a fabric, the set including:
a water-based ink for ink-jet recording including a colorant and water; and
the treatment agent for image recording of the first aspect.

According to a third aspect of the present teaching, there is provided a recording method for recording on a fabric by using the set of the second aspect, the recording method including:
applying the treatment agent for image recording to the fabric;
drying the treatment agent for image recording applied to the fabric; and
jetting the water-based ink onto the fabric by an ink-jet system.

DESCRIPTION OF THE EMBODIMENTS

[Treatment Agent for Image Recording]

Figure 1:
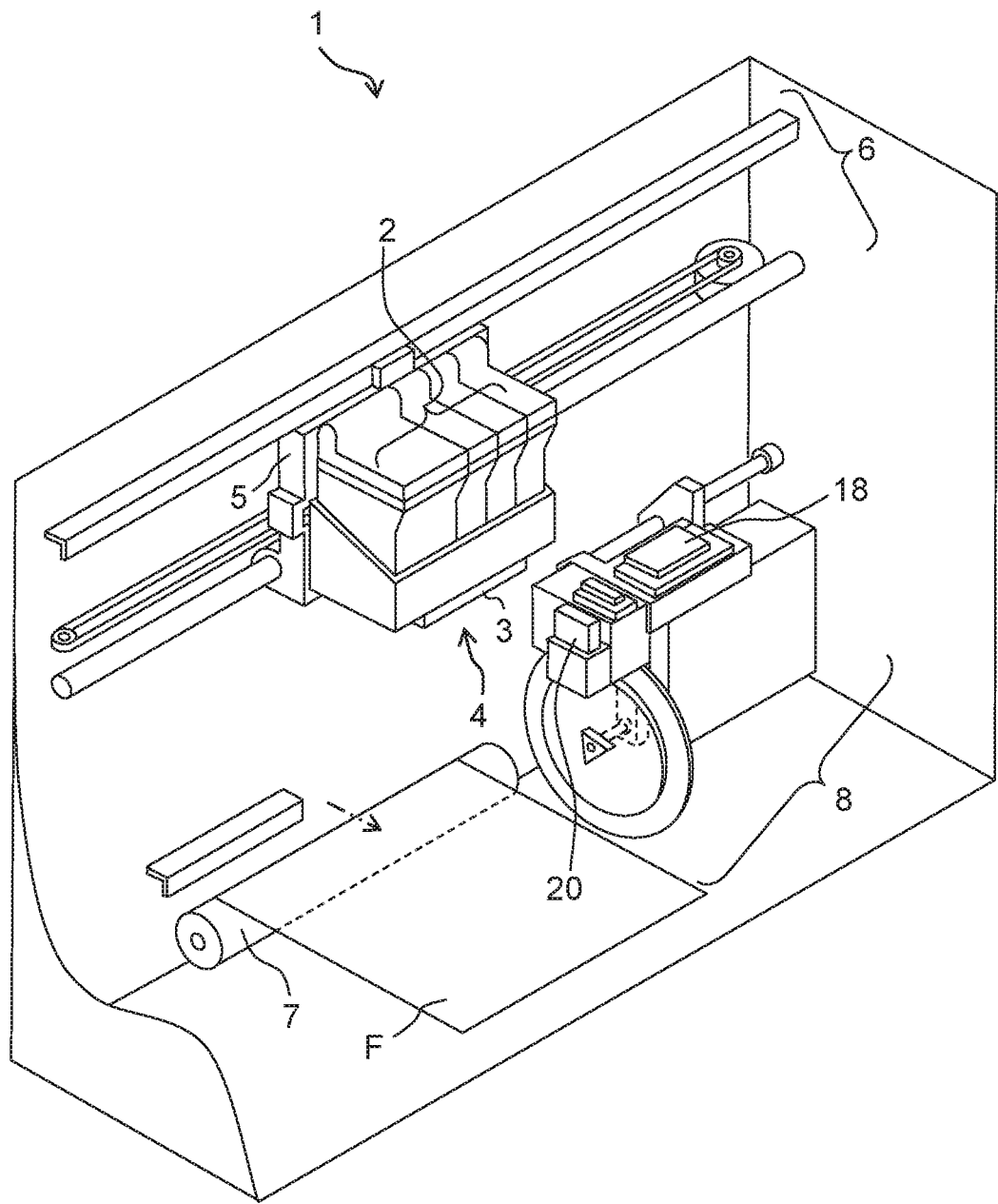
FIG. 1 is a schematic perspective view of an example of the configuration of an ink-jet recording apparatus of the present teaching.

A treatment agent for image recording of the present teaching will be explained. The treatment agent for image recording of the present teaching includes a cationic polymer emulsion, and a water-soluble organic solvent. The treatment agent for image recording of the present teaching is not, for example, an ink; the treatment agent for image recording of the present teaching preferably does not include a colorant such as a dye, a pigment, etc. In a case that the treatment agent for image recording of the present teaching include a colorant, a content amount of the colorant in the treatment agent for image recording is, for example, is such an amount by which the treatment agent for image recording is substantially not made to be an ink for recording. The content amount of the colorant in the entire amount of the treatment agent is, for example, in a range of 0% by mass to 1% by mass, or in a range of 0% by mass to 0.1% by mass, so as not to influence the color (hue) of a printed matter obtained by using the treatment agent for image recording.

The cationic polymer emulsion is composed, for example, of particles of a cationic polymer (minute or fine particles of resin; resin fine particles) and a dispersion medium (for example, water, etc.), and the resin fine particles are not in a dissolved state with respect to the dispersion medium; rather, the resin fine particles are dispersed in the dispersion medium with a predetermined particle diameter. Namely, the cationic polymer emulsion includes the dispersion medium and the particles of the cationic polymer dispersed in the dispersion medium. The cationic polymer emulsion is capable of including a cationic polymer which is insoluble or hardly soluble in water. Namely, the treatment agent including the cationic polymer emulsion of the present teaching improves the water resistance of a printer matter (fabric after recording), as compared with a treatment agent including a water-soluble cationic polymer which does not form the emulsion.

The cationic polymer included in the cationic polymer emulsion includes, for example, a cationic functional group such as an organic amine.

The cationic polymer emulsion is exemplified, for example, by a cationic polymer emulsion including a urethane structure, cationic styrene-acrylic emulsion, etc. The cationic polymer emulsion may include the urethane structure. Namely, the cationic polymer included in the cationic polymer emulsion may include the urethane structure. With this, the tactual sensation such as feel by hand, feel by skin, etc., is excellent in recording on the fabric. The urethane structure may be an ester-based urethane structure. Namely, the cationic polymer included in the cationic polymer emulsion may include the ester-base urethane structure. In a case that the urethane structure is the ester-based urethane structure, the tactual sensation such as feel by hand, feel by skin, etc., is more excellent in recording on the fabric. The cationic polymer including the urethane structure, in particular, the cationic polymer including ester-based urethane structure, is capable of forming an elastic film when being dried. With this, it is possible to suppress any hardening of the fabric after having the treatment agent applied thereto, and to realize excellent tactual sensation such as feel by hand, feel by skin, etc., after the recording.

The minimum film formation temperature (minimum film-forming temperature) of the cationic polymer emulsion is preferably not more than 40° C. The minimum film formation temperature of the cationic polymer emulsion may be, for example, not more than 20° C., or not more than 5° C. The term "minimum film-forming temperature" in the present teaching means a temperature which is minimally required for the polymer emulsion to form a film by being heated. The minimum film-forming temperature can be measured, for example, pursuant to "Determination of Minimum Film-forming Temperature" of JIS K 6828-2:2003, corresponding to ISO 2115: 1996. Specifically, the minimum film-forming temperature can be measured, for example, as follows. The polymer emulsion is coated on an aluminum plate imparted with temperature gradient. A temperature at a point of the aluminum plate, at which a dry coating film is formed, is measured as the minimum film-forming temperature by an apparatus for measuring minimum film forming temperature. An example of the apparatus for measuring minimum film forming temperature includes, for example, "Minimum Film Forming Temperature Bar 90" produced by PHOPOINT INSTRUMENTS LTD., etc.

The cationic polymer emulsion may be privately prepared in-house, or any commercially available product may be used therefor. The commercially available product is exemplified, for example, by "MOWINYL (trade name) 6910" (cationic polymer emulsion including an ester-based urethane structure) and "MOWINYL (trade name) 6901" (cationic styrene-acrylic emulsion) manufactured by JAPAN COATING RESIN CO., LTD.; "SUPERFLEX (trade name) 620" (cationic polymer emulsion including an ester-based urethane structure), "SUPERFLEX (trade name) 650" (cationic polymer emulsion including a urethane structure) manufactured by DKS CO., LTD (DAI-ICHI KOGYO SEIYAKU CO., LTD); and the like. One kind of the cationic polymer emulsion as described above may be used singly, or two or more kinds of the cationic polymer emulsion as described above may be used in combination.

The average particle diameter (particle size) of the cationic polymer emulsion, namely, the average particle diameter of the particles of the cationic polymer included in the cationic polymer emulsion is, for example, in a range of 100 nm to 300 nm. The average particle diameter can be measured, for example, by performing measurement using a dynamic light scattering particle diameter distribution measuring apparatus "LB-500" manufactured by HORIBA, LTD., as the number length mean diameter.

The cationic polymer emulsion including the urethane structure preferably includes at least one of the acrylic structure and the styrene structure in a part, of the cationic polymer emulsion including the urethane structure, which is different from the urethane structure, and more preferably includes the acrylic structure in the part different from the urethane structure (is more preferably a urethane acrylic emulsion). Among the above-described commercially available products, the urethane acrylic emulsion is exemplified, for example, by "MOWINYL (trade name) 6910", "SUPERFLEX (trade name) 620", and "SUPERFLEX (trade name) 650".

It is preferred that a ratio of a part of the urethane structure (a ratio of occupation of the urethane structure, or a ratio of the urethane structure) is not less than 10% by mass, more preferably not less than 20% by mass in the cationic polymer emulsion including the urethane structure. Note that such a phrase that "ratio of the urethane structure" means a ratio of the urethane structure in a solid content of the cationic polymer emulsion including the urethane structure (in the cationic polymer including the urethane structure). The urethane structure is preferably a part obtained, for example, from aliphatic isocyanate and polyether-based polyol or polyester-based polyol.

A content amount (B) of the cationic polymer emulsion in the entire amount of the treatment agent for image recording is, for example, in a range of 1% by mass to 40% by mass, in a range of 2% by mass to 25% by mass, or in a range of 2.5% by mass to 20% by mass (condition (2): $2.5 \leq B \leq 20$). In a case that the content amount (B) is made to be not less than 2.5% by mass, the water resistance is further excellent in the recording on fabric. Further, in a case that the content amount (B) is made to be not more than 20% by mass, the tactual sensation such as feel by hand, feel to skin (feel by skin), etc., is further excellent in recording on the fabric. Note that the content amount (B) is a solid content amount of the cationic polymer emulsion in the entire amount of the treatment agent for image recording. Namely, the content amount (B) is a content amount of the cationic polymer, which is included in the cationic polymer emulsion, in the entire amount of the treatment agent for image recording.

It is allowable that the treatment agent for image recording includes a cationic polymer emulsion not including the urethane structure, or that the treatment agent does not. However, in view of the suppressing any change in texture or tactile sensation, such as hand feeling, feel by skin, etc., between before and after recording, it is preferred that a content amount (% by mass) of the cationic polymer emulsion not including the urethane structure in the entire amount of the treatment agent is less than the content amount (% by mass) of the cationic polymer emulsion including the urethane structure (cationic polymer urethane emulsion) in the entire amount of the treatment agent. From a similar viewpoint, it is preferred that the treatment agent does not substantially include the cationic polymer emulsion not including the urethane structure. In the treatment agent, the ratio of the solid content amount of the cationic urethane emulsion to the total solid content amounts of all the cationic polymer emulsions in the entire amount of the treatment agent is, for example, not less than 50% by mass, not less than 90% by mass, or is 100% by mass.

The water-soluble organic solvent includes a glycol-based water-soluble organic solvent of which boiling point is not more than 200° C. (glycol of which boiling point is not more than 200° C.) (also referred to as a "specific glycol-based solvent", in some cases). The specific glycol-based solvent is exemplified, for example, by ethylene glycol (boiling point: 196° C.), propylene glycol (boiling point: 188° C.), 1,2-butanediol (boiling point: 194° C.), 2,3-butanediol (boiling point: 183° C.), and the like. Among the above-described substances, the propylene glycol is preferred since the propylene glycol is safe to human body and has an excellent balance between the wettability and volatility. One kind of the specific glycol-based solvent as described above may be used singly, or two or more kinds of the specific glycol-based solvent as described above may be used in combination.

A content amount (A) of the specific glycol-based solvent in the entire amount of the treatment agent for image recording is, for example, in a range of 20% by mass to 60% by mass (condition (1): 20≤A≤60). The content amount (A) may be, for example, in a range of 30% by mass to 50% by mass. In a case that the content amount (A) is less than 20% by mass, there is such a fear that the storage stability in low-temperature storage might be unsatisfactory. In a case that the content amount (A) is more than 60% by mass, there is such a fear that the water resistance of a printer matter (fabric after recording) might be low.

In a case that the treatment agent for image recording related to the present teaching includes the cationic polymer emulsion and that the content amount (A) is made to be within the above-described range, the water resistance in the recording on fabric and the storage stability in the low-temperature storage are excellent, and the mechanism therefore is presumed as follows. Namely, the cationic polymer emulsion is capable of including a cationic polymer which is insoluble or hardly soluble in water. The cationic polymer interacts with a colorant (for example, an anionic dye) included in an ink usable for image recording so that the cationic polymer is capable of remaining in the fabric together with the colorant, thereby improving the water resistance of the printer matter (fabric after recording). Further, in a case that the treatment agent is solidified when being stored at a low temperature, there is such a fear that the dispersion state of the cationic polymer emulsion might be destroyed. By allowing the treatment agent to contain a predetermined amount of the specific glycol-based solvent, it is possible to lower the freezing (settling) point of the treatment agent and to maintain the dispersion state of the cationic polymer emulsion at a low temperature, which in turn improves the storage stability in the low-temperature storage of the treatment agent. This mechanism, however, is merely a presumption, and the present teaching is not limited to or restricted by this presumed mechanism.

It is allowable that the treatment agent for image recording includes a (another) water-soluble organic solvent different from the above-described specific glycol-based solvent or that the treatment agent for image recording does not include the (another) water-soluble organic solvent different from the above-described specific glycol-based solvent. It is allowable that the water-soluble organic solvent includes substantially only the specific glycol-based solvent. In the treatment agent for image recording, the mass ratio of the specific glycol-based solvent occupying in the entire amount of the water-soluble organic solvent is, for example, not less than 80% by mass, not less than 95% by mass, or is 100% by mass. In a case that the mass ratio of the specific glycol-based solvent occupying in the entire amount of the water-soluble organic solvent is less than the above-described value, there is such a fear that the balance between the wettability and the volatility might be lost. For example, in such a case that the mass ratio of the glycerol (trihydric alcohol; boiling point: 290° C.) occupying in the entire amount of the water-soluble organic solvent is high and that the mass ratio of the specific glycol-based solvent occupying in the entire amount of the water-soluble organic solvent is less than the above-described value, there is such a fear that sufficient volatility might not be obtained, which might result in such a situation that the drying of the treatment agent applied to the fabric might insufficient, and that a recorded image might blur or bleed.

The treatment agent for image recording preferably satisfies the following condition (5). In the treatment agent satisfying the condition (5), the water resistance in the recording on fabric is further excellent.

$$B/A \geq 0.08 \quad (5)$$

In the condition (5),

A: the content amount (% by mass) of the specific glycol-based solvent in the entire amount of the treatment agent for image recording, and B: the solid content amount (% by mass) of the cationic polymer emulsion in the entire amount of the treatment agent for image recording.

On the other hand, from the viewpoint of suppressing the viscosity of the treatment agent from rising due to evaporation of water, the ratio (B/A) is preferably, for example, not more than 0.9, not more than 0.7, or not more than 0.5.

The treatment agent for image recording may further include water. The water is preferably ion-exchange water or purified water (pure water). A content amount (C) of the water in the entire amount of the treatment agent for image recording is, for example, in a range of 10% by mass to 90% by mass, or in a range of 20% by mass to 80% by mass. The content amount (C) may be, for example, a balance of the other components.

It is preferred that the treatment agent for image recording satisfies the following condition (3), and it is more preferred that the treatment agent for image recording satisfies the following condition (4). By allowing a ratio (A/C) of the specific glycol-based solvent (A) to the water (C) to be not less than the following value, it is possible to sufficiently lower the boiling point of the treatment agent, thereby making it possible to easily maintain the dispersion state of the cationic polymer emulsion at a low temperature. Accordingly, the treatment agent for image recording satisfying the condition (3) has further excellent storage stability in the low-temperature storage. The treatment agent for image recording satisfying the condition (4) has furthermore excellent storage stability in the low-temperature storage.

$$A/C \geq 0.33 \quad (3)$$

$$A/C \geq 0.58 \quad (4)$$

In each of the conditions (3) and (4),

A: the content amount (% by mass) of the specific glycol-based solvent in the entire amount of the treatment agent for image recording, and C: the content amount (% by mass) of the water in the entire amount of the treatment agent for image recording.

On the other hand, as the ratio (A/C) of the specific glycol-based solvent (A) to the water (C) is lower, the volatility and the drying property of the treatment agent is more improved. From these viewpoints as described above, the ratio (A/C) is preferably not more than 2.2, not more than 1.8, or not more than 1.4.

The treatment agent for image recording may further include at least one of a nonionic surfactant and a cationic surfactant.

It is allowable to use, as the nonionic surfactant, for example, a commercially available product. An Example of the commercially available nonionic surfactant includes, for example, nonionic surfactants produced by LION SPECIALTY CHEMICALS CO., LTD., including "DOBANOX (trade name)" series, "LEOCOL (trade name)" series, "LEOX (trade name)" series, "LAOL, LEOCON (trade name)" series, "LIONOL (trade name)" series, "CADENAX (trade name)" series, "LIONON (trade name)" series, "LEOFAT (trade name)" series, etc.; nonionic surfactants produced by KAO CORPORATION, including "EMULGEN (trade name)" series, "RHEODOL (trade name)" series, "EMASOL (trade name)" series, "EXCEL (trade name)" series, "AMINON (trade name)" series, etc.; nonionic surfactants produced by NIS SHIN CHEMICAL CO., LTD., including "OLFIN (trade name)" series, etc.; and the like.

The cationic surfactant described above is exemplified, for example, by quaternary ammonium salt, quaternary ammonium ion, primary, secondary, and tertiary amine salt type compounds, alkylamine salt, dialkylamine salt, aliphatic amine salt, alkylpyridinium salt, imidazolinium salt, sulfonium salt, phosphonium salt, onium salt, etc. Specified examples of the cationic surfactant other than the quaternary ammonium salt and the quaternary ammonium ion are exemplified, for example, by hydrochlorides and acetates of laurylamine, palm amine, rosin amine and the like, cetylpyridinium chloride, cetylpyridinium bromide, dihydroxyethyllaurylamine, etc.

The quaternary ammonium salt is exemplified, for example, by a cationic compound represented by the following formula (1).

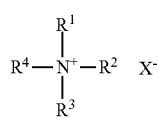

(1)

In the formula (1), $R^1$ to $R^4$ are hydrocarbon groups each having 1 to 30 carbon atoms; $R^1$ to $R^4$ may be identical with one another or different from one another; and $X^-$ is an anion.

In the formula (1), $R^1$ to $R^3$ may be alkyl groups each having 1 to 5 carbon atoms. The alkyl group having 1 to 5 carbon atoms may have a straight chain or a branched chain, and can be exemplified, for example by: methyl group, ethyl group, n-propyl group, isopropyl group, n-butyl group, sec-butyl group, isobutyl group, tert-butyl group, n-pentyl group, isopentyl group, sec-pentyl group, 3-pentyl group, tert-pentyl group, etc. The alkyl group having 1 to 5 carbon atoms may have a substituent group such as halogen atom or the like. In the formula (1), $R^1$ to $R^3$ may be identical with one another or different from one another.

In the formula (1), $R^4$ may be an alkyl group having 6 to 30 carbon atoms. The alkyl group having 6 to 30 carbon atoms is exemplified, for example, by hexyl group, heptyl group, octyl group, nonyl group, decyl group, lauryl group (dodecyl group), tetradecyl group, cetyl group (hexadecyl group), etc. The alkyl group having 6 to 30 carbon atoms may have a substituent group such as halogen atom or the like, and may have either a straight chain or a branched chain.

In the formula (1), $X^-$ is an anion. Although the anion may be any anion, the anion may be exemplified, for example, by methylsulfate ion, ethylsulfate ion, sulfate ion, nitrate ion, acetate ion, dicarboxylate (for example, malate, itaconate and the like) ion, tricarboxylate (for example, citrate and the like) ion, hydroxide ion, halide ion, etc. In a case that $X^-$ is dicarboxylate ion or tricarboxylate ion, dicarboxylate ion or tricarboxylate ion is the counter ion for two or three quaternary ammonium ions (cations obtained by removing $X^-$ from the formula (1)).

The cationic compound represented by the formula (1) is exemplified, for example, by lauryltrimethylammonium sulfate, lauryltrimethylammonium chloride, cetyltrimethylammonium chloride, benzyldimethylalkylammonium chloride, etc. The cationic compound represented by the formula (1) may be privately prepared in-house, or any commercially available product may be used therefor. The commercially available product is exemplified, for example, by "CATIOGEN (trade name) TML", "CATIOGEN (trade name) TMP", and "CATIOGEN (trade name) ES-O" produced by DAI-ICHI KOGYO SEIYAKU CO., LTD.; "Benzalkonium chloride" produced by TOKYO KASEI KOGYO CO., LTD.; and the like.

The quaternary ammonium ion is exemplified, for example, by a cation obtained by removing $X^-$ from the formula (1).

One kind of each of the nonionic surfactant and the cationic surfactant as described above may be used singly, or two or more kinds of each of the nonionic surfactant and the cationic surfactant as described above may be used in combination.

A content amount (S) of at least one of the nonionic surfactant and the cationic surfactant in the entire amount of the treatment agent for image recording is, for example, in a range of 0.05% by mass to 20% by mass, in a range of 0.1% by mass to 10% by mass, or in a range of 0.2% by mass to 5% by mass. Note that the content amount (S) is an effective ingredient amount.

It is preferred that the treatment agent for image recording does not substantially include the anionic surfactant. There is a fear that the anionic surfactant might interact with the cationic polymer emulsion. With this, there is a fear that the interaction between the cationic polymer emulsion and the colorant in the ink might be hindered or adversely affected. The content amount of the anionic surfactant in the entire amount of the treatment agent for image recording is, for example, 0% by mass, or in a range of 0% by mass to 0.01% by mass.

The treatment agent for image recording may further include a conventionally known additive, as necessary. The additive is exemplified, for example, by pH-adjusting agents, viscosity-adjusting agents, surface tension-adjusting agents, fungicides, etc. The viscosity-adjusting agents are exemplified, for example, by polyvinyl alcohol, cellulose, water-soluble resin, etc.

The treatment agent for image recording can be prepared, for example, by uniformly mixing the cationic polymer emulsion and the specific glycol-based solvent, and an optionally other additive(s) as necessary, by a conventionally known method. The treatment agent may be, for example, an aqueous treatment agent (treatment agent-liquid) or a gel treatment agent. In a case that the treatment agent is the aqueous treatment agent (treatment agent-liquid)

or the gel treatment agent, the treatment agent can be easily coated on (applied to) the recording medium.

The pH of the treatment agent for image recording is, for example, in a range of 4 to 8.

The viscosity of the treatment agent for image recording is, for example, not more than 100 mPa·s, not more than 20 mPa·s, or not more than 10 mPa·s. The viscosity is a value measured at 25° C.

Although the treatment agent for image recording of the present teaching may be used suitably for recording on the fabric, the treatment agent for image recording may be usable suitable also for recording on a recording medium different from the fabric, such as, for example, recording paper. The fabric includes both of knit and textile. The material of the fabric may be either natural fiber or synthetic fiber. The natural fiber is exemplified, for example, by cotton, silk, etc. The synthetic fiber is exemplified, for example, by urethane, acrylic, polyester, nylon fibers, etc.

As explained above, the treatment agent for image recording of the present teaching includes the cationic polymer emulsion and a predetermined amount of the glycol-based water-soluble organic solvent of which boiling point is not more than 200° C., and thus has the excellent water resistance in the recording on the fabric and the excellent storage stability in the low-temperature storage.

[Set of Ink and Treatment Agent for Image Recording]

Next, an explanation will be given about a set of an ink and a treatment agent for image recording of the present teaching. The set of the ink and the treatment agent for image recording of the present teaching is a set of an ink and a treatment agent for image recording which is used (usable) for the recording on fabric, and which includes a water-based ink for ink-jet recording (hereinafter referred also to as a "water-based ink" or and "ink" in some cases), and the treatment agent for image recording of the present teaching. In the set of the ink and the treatment agent for image recording of the present teaching, the water-based ink may be one kind of the water-based ink, or may be two or more kinds of the water-based ink.

<Water-Based Ink>

The water-based ink will be explained. The water-based ink includes a colorant and water.

It is allowable that the colorant is any one of a dye and a pigment, and that the dye and the pigment are used in a mixed manner. It is preferred, however, that the colorant is the dye. The dye is exemplified, for example, by an anionic dye, etc. The electric charge of the anionic dye is canceled by the cationic polymer emulsion included in the treatment agent, and thus the anionic dye coagulates (aggregates) or becomes viscous. With this, a printed matter (fabric after recording) has an excellent water resistance.

The dye is not specifically limited, and is exemplified, for example, by a direct dye, an acidic dye, a basic dye, a reactive dye, a food dye, etc. Specific examples of the dye include, for example, C. I. Direct Black, C. I. Direct Blue, C. I. Direct Red, C. I. Direct Yellow, C. I. Direct Orange, C. I. Direct Violet, C. I. Direct Brown, C. I. Direct Green; C. I. Acid Black, C. I. Acid Blue, C. I. Acid Red, C. I. Acid Yellow, C. I. Acid Orange, C. I. Acid Violet; C. I. Basic Black, C. I. Basic Blue, C. I. Basic Red, C. I. Basic Violet; C. I. Reactive Blue, C. I. Reactive Red, C. I. Reactive Yellow; C. I. Food Black, C. I. Food Red, C. I. Food Yellow; and the like. C. I. Direct Black described above is exemplified, for example, by C. I. Direct Blacks 17, 19, 22, 31, 32, 51, 62, 71, 74, 108, 112, 113, 146, 154, 168, 195, etc. C. I. Direct Blue described above is exemplified, for example, by C. I. Direct Blues 1, 6, 15, 22, 25, 41, 71, 76, 77, 80, 86, 90, 98, 106, 108, 120, 158, 163, 168, 199, 226, etc. C. I. Direct Red described above is exemplified, for example, by C. I. Direct Reds 1, 2, 4, 9, 11, 17, 20, 23, 24, 28, 31, 39, 46, 62, 75, 79, 80, 83, 89, 95, 197, 201, 218, 220, 224, 225, 226, 227, 228, 229, 230, etc. C. I. Direct Yellow described above is exemplified, for example, by C. I. Direct Yellows 8, 11, 12, 24, 26, 27, 28, 33, 39, 44, 50, 58, 85, 86, 87, 88, 89, 98, 100, 110, 132, 142, 173, etc. C. I. Direct Orange described above is exemplified, for example, by C. I. Direct Oranges 34, 39, 44, 46, 60, etc. C. I. Direct Violet described above is exemplified, for example, by C. I. Direct Violets 47, 48, etc. C. I. Direct Brown described above is exemplified, for example, by C. I. Direct Brown 109, etc. C. I. Direct Green described above is exemplified, for example, by C. I. Direct Green 59, etc. C. I. Acid Black described above is exemplified, for example, by C. I. Acid Blacks 2, 7, 24, 26, 31, 48, 51, 52, 63, 110, 112, 115, 118, 156, etc. C. I. Acid Blue described above is exemplified, for example, by C. I. Acid Blues 1, 7, 9, 15, 22, 23, 25, 29, 40, 43, 59, 62, 74, 78, 80, 90, 93, 100, 102, 104, 117, 120, 127, 138, 158, 161, 167, 220, 234, etc. C. I. Acid Red described above is exemplified, for example, by C. I. Acid Reds 1, 6, 8, 9, 13, 14, 18, 26, 27, 32, 35, 37, 42, 51, 52, 80, 83, 85, 87, 89, 92, 94, 106, 114, 115, 133, 134, 145, 158, 180, 198, 249, 256, 265, 289, 315, 317, etc. C. I. Acid Yellow described above is exemplified, for example, by C. I. Acid Yellows 1, 3, 7, 11, 17, 23, 25, 29, 36, 38, 40, 42, 44, 61, 71, 76, 98, 99, etc. C. I. Acid Orange described above is exemplified, for example, by C. I. Acid Oranges 7, 19, etc. C. I. Acid Violet described above is exemplified, for example, by C. I. Acid Violet 49, etc. The C. I. Basic Black is exemplified, for example, by C. I. Basic Black 2, etc. The C. I. Basic Blue is exemplified, for example, by C. I. Basic Blues 1, 3, 5, 7, 9, 24, 25, 26, 28, 29, etc. The C. I. Basic Red is exemplified, for example, by C. I. Basic Reds 1, 2, 9, 12, 13, 14, 37, etc. The C. I. Basic Violet is exemplified, for example, by C. I. Basic Violets 7, 14, 27, etc. C. I. Reactive Blue described above is exemplified, for example, by C. I. Reactive Blues 4, 5, 7, 13, 14, 15, 18, 19, 21, 26, 27, 29, 32, 38, 40, 44, 100, etc. C. I. Reactive Red described above is exemplified, for example, by C. I. Reactive Reds 7, 12, 13, 15, 17, 20, 23, 24, 31, 42, 45, 46, 59, etc. C. I. Reactive Yellow described above is exemplified, for example, by C. I. Reactive Yellows 2, 3, 17, 25, 37, 42, etc. C. I. Food Black described above is exemplified, for example, by C. I. Food Blacks 1, 2, etc. C. I. Food Red described above is exemplified, for example, by C. I. Food Reds 87, 92, 94, etc. C. I. Food Yellow described above is exemplified, for example, by C. I. Food Yellow 3, etc.

It is allowable that one kind of the dye as described above is used singly, or two or more kinds of the dye are used in combination. The content amount of the dye in the entire amount of the water-based ink is, for example, in a range of 0.1% by mass to 20% by mass, in a range of 1% by mass to 15% by mass, or in a range of 2% by mass to 10% by mass.

The pigment is exemplified, for example, by a resin-dispersible pigment (resin-dispersed pigment), self-dispersible pigment, etc.

The resin-dispersed pigment is dispersible in water by, for example, a resin for dispersing pigment (resin dispersant). A pigment usable as the resin-dispersed pigment is not particularly limited, and is exemplified, for example, by carbon black, an inorganic pigment, an organic pigment, etc. The carbon black is exemplified, for example, by furnace black, lamp black, acetylene black, channel black, etc. The inorganic pigment is exemplified, for example, by titanium oxide, inorganic pigments based on iron oxide, inorganic pigments based on carbon black, etc. The organic pigment is exemplified, for example, by azo-pigments such as azo lake, insoluble azo-pigment, condensed azo-pigment, chelate azo-pigment, etc.; polycyclic pigments such as phthalocyanine pigment, perylene and perynon pigments, anthraquinone pigment, quinacridone pigment, dioxadine pigment, thioindigo pigment, isoindolinone pigment, quinophthalone pigment etc.; dye lake pigments such as basic dye type lake pigment, acid dye type lake pigment etc.; nitro pigments; nitroso pigments; aniline black daylight fluorescent pigment; and the like. Specific examples of these pigments are exemplified, for example, by C. I. Pigment Blacks 1, 6, and 7; C. I. Pigment Yellows 1, 2, 3, 12, 13, 14, 15, 16, 17, 55, 73, 74, 75, 78, 83, 93, 94, 95, 97, 98, 114, 128, 129, 138, 150, 151, 154, 180, 185, and 194; C. I. Pigment Oranges 31 and 43; C. I. Pigment Reds 2, 3, 5, 6, 7, 12, 15, 16, 48, 48:1, 53:1, 57, 57:1, 112, 122, 123, 139, 144, 146, 149, 150, 166, 168, 175, 176, 177, 178, 184, 185, 190, 202, 221, 222, 224, and 238; C. I. Pigment Violet 19, 196; C. I. Pigment Blues 1, 2, 3, 15, 15:1, 15:2, 15:3, 15:4, 16, 22, and 60; C. I. Pigment Greens 7 and 36; and the like. Further, the resin-dispersed pigment may be a solid solution of any one of the above-described pigments.

The self-dispersible pigment is dispersible in water without using any dispersant, for example, owing to the fact that at least one of a hydrophilic functional group and the salt thereof including, for example, carbonyl group, hydroxyl group, carboxylic acid group, sulfonic acid group (sulfonate group), phosphoric acid group (phosphate group), etc., is introduced into the surfaces of the particles of the pigment by the chemical bond directly or with any group intervening therebetween. It is possible to use, as the self-dispersible pigments, a self-dispersible pigment wherein the pigment is subjected to a treatment by any one of methods described, for example, in Japanese Patent Application Laid-open No. HEI8-3498 corresponding to U.S. Pat. No. 5,609,671, Published Japanese Translation of PCT International Publication for Patent Application No. 2000-513396 corresponding to U.S. Pat. No. 5,837,045, Published Japanese Translation of PCT International Publication for Patent Application No. 2008-524400 corresponding to United States Patent Application Publication No. US 2006/0201380 A1, Published Japanese Translation of PCT International Publication for Patent Application No. 2009-515007 corresponding to United States Patent Application Publications No. US 2007/0100023 A1 and No. US 2007/0100024 A1, Published Japanese Translation of PCT International Publication for Patent Application No. 2011-515535 corresponding to United States Patent Application Publication No. US 2009/0229489 A1, etc. The pigment which is suitable for the above-described treatment includes, for example, carbon black such as "MA8", "MA100" and "#2650" produced by MITSUBISHI CHEMICAL CORPORATION, "Color Black FW200" produced by DEGUSSA-HÜLS AG, etc. As the self-dispersible pigment, it is possible, for example, to use a commercially available product. The commercially available product includes, for example, "CAB-O-JET (trade name) 200", "CAB-O-JET (trade name) 250C", "CAB-O-JET (trade name) 260M", "CAB-O-JET (trade name) 270Y", "CAB-O-JET (trade name) 300", "CAB-O-JET (trade name) 400", "CAB-O-JET (trade name) 450C", "CAB-O-JET (trade name) 465M" and "CAB-O-JET (trade name) 470Y" produced by CABOT CORPORATION; "BONJET (trade name) BLACK CW-2" and "BONJET (trade name) BLACK CW-3" produced by ORIENT CHEMICAL INDUSTRIES, LTD.; "LIOJET (trade name) WD BLACK 002C" produced by TOYO INK SC HOLDINGS CO., LTD.; and the like.

One kind of the pigment may be used singly, or two or more kinds of the pigment may be used in combination. The solid content amount of the pigment in the entire amount of the water-based ink is, for example, in a range of 0.1% by mass to 20% by mass; in a range of 1% by mass to 15% by mass; or in a range of 2% by mass to 10% by mass.

The water is preferably ion-exchange water or purified water (pure water). The content amount of the water in the entire amount of the water-based ink is, for example, in a range of 10% by mass to 90% by mass, in a range of 40% by mass to 80% by mass, or in a range of 50% by mass to 80% by mass. The content amount of the water in the entire amount of the water-based ink may be, for example, a balance of the other components.

The water-based ink may further include a water-soluble organic solvent. The water-soluble organic solvent is exemplified, for example, by a humectant which prevents the ink from drying at an end of a nozzle in an ink-jet head, a penetrant which adjusts the drying velocity on a recording medium, etc.

The humectant is not particularly limited, and is exemplified, for example, by lower alcohols such as methyl alcohol, ethyl alcohol, n-propyl alcohol, isopropyl alcohol, n-butyl alcohol, sec-butyl alcohol, tert-butyl alcohol, etc.; amides such as dimethylformamide, dimethylacetamide, etc.; ketones such as acetone, etc.; ketoalcohols (ketone alcohols) such as diacetone alcohol, etc.; ethers such as tetrahydrofuran, dioxane, etc.; polyethers such as polyalkylene glycol, etc.; polyvalent alcohols such as alkylene glycol, glycerol, trimethylolpropane, trimethylolethane, etc.; 2-pyrrolidone; N-methyl-2-pyrrolidone; 1,3-dimethyl-2-imidazolidinone; and the like. The polyalkylene glycol is exemplified, for example, by polyethylene glycol, polypropylene glycol, etc. The alkylene glycol is exemplified, for example, by ethylene glycol, propylene glycol, butylene glycol, diethylene glycol, triethylene glycol, dipropylene glycol, tripropylene glycol, thiodiglycol, hexylene glycol, etc. It is allowable that one kind of the humectant as described above is used singly, or two or more kinds of the humectant are used in combination. Among the above-described humectants, the humectant is preferably a polyvalent alcohol such as alkylene glycol, glycerol, etc.

The content amount of the humectant in the entire amount of the water-based ink is, for example, in a range of 0% by mass to 95% by mass, in a range of 5% by mass to 80% by mass, or in a range of 5% by mass to 50% by mass.

The penetrant is exemplified, for example, by glycol ether. The glycol ether is exemplified, for example, by ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether, etc. One kind of the penetrant may be used singly, or two or more kinds of the penetrant may be used in combination.

The content amount of the penetrant in the entire amount of the ink is, for example, in a range of 0% by mass to 20% by mass, in a range of 0% by mass to 15% by mass, or in a range of 1% by mass to 4% by mass.

The water-based ink may further include a conventionally known additive, as necessary, which is similar to those as exemplified in relation to the surfactant and the above-described treatment agent for image recording.

The water-based ink can be prepared, for example, by uniformly mixing the colorant and the water, and an optionally other additive(s) as necessary, by a conventionally known method, and then removing any non-dissolved matter, with a filter, etc.

The treatment agent for image recording in the set of the ink and the treatment agent for image recording of the present teaching is similar to the above-described treatment agent for image recording of the present teaching, and thus the explanation for the above-described treatment agent for image recording of the present teaching can be quoted herein by reference.

Although the set of the ink and the treatment agent for image recording of the present teaching may be used suitably for recording on the fabric, the set may be usable suitable also for recording on a recording medium different from the fabric, such as, for example, recording paper.

[Recording Method and Ink-Jet Recording Apparatus]

Next, an explanation will be given about a recording method of the present teaching.

The recording method of the present teaching is a recording method for recording on a fabric by using the set of the ink and the treatment agent for image recording of the present teaching, the recording method including: applying the treatment agent for image recording to the fabric (a step for applying the treatment agent); drying the treatment agent for image recording applied to the fabric (a step for drying); and recording on the fabric by jetting the water-based ink onto the fabric by an ink-jet system (a step for recording). The recording includes printing a letter (text), printing an image, printing, etc.

The set of the ink and the treatment agent for image recording in the recording method of the present teaching is similar to the above-described set of the ink and the treatment agent for image recording of the present teaching, and thus the explanation for the above-described set of the present teaching can be quoted herein by reference.

The recording method of the present teaching can be carried out, for example, by using an ink-jet recording apparatus of the present teaching which is explained in the following.

The ink-jet recording apparatus of the present teaching is an ink-jet recording apparatus including: an ink set accommodating section; a treatment agent applying mechanism; and an ink jetting (discharging) mechanism. The set of the ink and the treatment agent for image recording of the present teaching is accommodated in the ink set accommodating section; the treatment agent for image recording composing the above-described set of the ink and the treatment agent for image recording is applied onto a recording medium by the treatment agent applying mechanism; and the water-based ink composing the above-described set of the ink and the treatment agent for image recording is jetted onto the recording medium by the ink jetting mechanism.

FIG. 1 depicts an example of the configuration of the ink-jet recording apparatus of the present teaching. As depicted in FIG. 1, an ink-jet recording apparatus 1 includes, as main constitutive components, four ink cartridges (ink containers) 2, an ink jetting (discharging) mechanism (ink-jet head) 3, a head unit 4, a carriage 5, a driving unit 6, a platen roller 7, and a purge device 8.

Each of the four ink cartridges 2 contains one color ink of four water-based color inks which are yellow, magenta, cyan, and black inks. For example, at least one of the four color water-based inks is the water-based ink composing the set of the ink and the treatment agent for image recording of the present teaching. In this exemplary embodiment, a set of the four ink cartridges 2 are depicted. However, in place of this four-ink cartridge set, it is also allowable to use an integrated type ink cartridge in which the interior thereof is comparted so that a water-based yellow ink accommodating section, a water-based magenta ink accommodating section, a water-based cyan ink accommodating section, and a water-based black ink accommodating section are formed. As a main body of the ink cartridge, it is allowable to use, for example, any conventionally known main body of an ink cartridge.

The ink-jet head 3 disposed on the head unit 4 performs recording on fabric F. The four ink cartridges 2 and the head unit 4 are provided or arranged on the carriage 5. The driving unit 6 reciprocates the carriage 5 in a linear direction. As the driving unit 6, it is possible to use, for example, a conventionally known driving unit (see, for example, Japanese Patent Application laid-open No. 2008-246821 corresponding to United States Patent Application Publication No. US2008/0241398 A1). The platen roller 7 extends in the reciprocating direction of the carriage 5 and is arranged to face the ink-jet head 3.

The purge device 8 sucks or draws unsatisfactory ink (poor ink) which contains air bubbles, etc., accumulated or trapped in the inside of the ink-jet head 3. As the purge device 8, it is possible to use, for example, a conventionally known purge device (for example, see Japanese Patent Application laid-open No. 2008-246821 corresponding to United States Patent Application Publication No. US2008/0241398 A1).

A wiper member 20 is provided on the purge device 8 at a position on the side of the platen roller 7 such that the wiper member 20 is adjacent to the purge device 8. The wiper member 20 is formed to have a spatula shape, and wipes a nozzle-formed surface of the ink-jet head 3 accompanying with the movement (reciprocating movement) of the carriage 5. In FIG. 1, a cap 18 is provided to cover a plurality of nozzles of the ink-jet head 3 which is returned to a reset position upon completion of recording (image printing, image recording), so as to prevent the water-based inks from drying.

In the ink-jet recording apparatus 1 of the present embodiment, the four ink cartridges (ink containers) 2 are provided, together with the head unit 4, on one carriage 5. However, the present teaching is not limited to or restricted by this. In the ink-jet recording apparatus 1, the respective four ink cartridges 2 may be provided on a carriage which is different (separate) from the carriage on which the head unit 4 is provided. Alternatively, the respective four ink cartridges 2 may be arranged and fixed inside the ink-jet recording apparatus 1, rather than being provided on the carriage 5. In such aspects, for example, the four ink cartridges 2 are connected to the head unit 4 provided on the carriage 5 with tubes, etc., and the water-based inks are supplied from the four ink cartridges 2 via the tubes, respectively, to the head unit 4. Further, in these aspects, it is allowable to use four ink bottles having a bottle shape as the ink containers, instead of using the four ink cartridges 2. In such a case, each of the ink bottles is preferably provided with an inlet port via which the ink is poured from the outside to the inside of each of the ink bottles.

The recording using the ink-jet recording apparatus 1 is performed, for example, in the following manner (see FIG. 4).

Figure 3A:
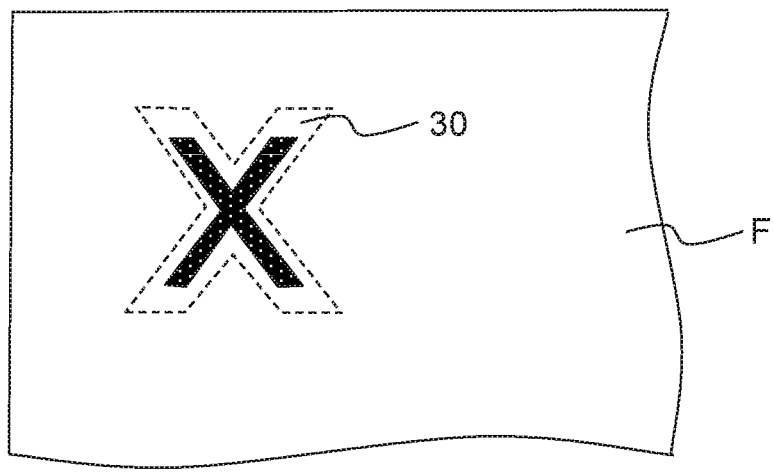
FIGS. 3A and 3B are each a view depicting an example of application of a treatment agent for image recording in a recording method of the present teaching.
Figure 3B:
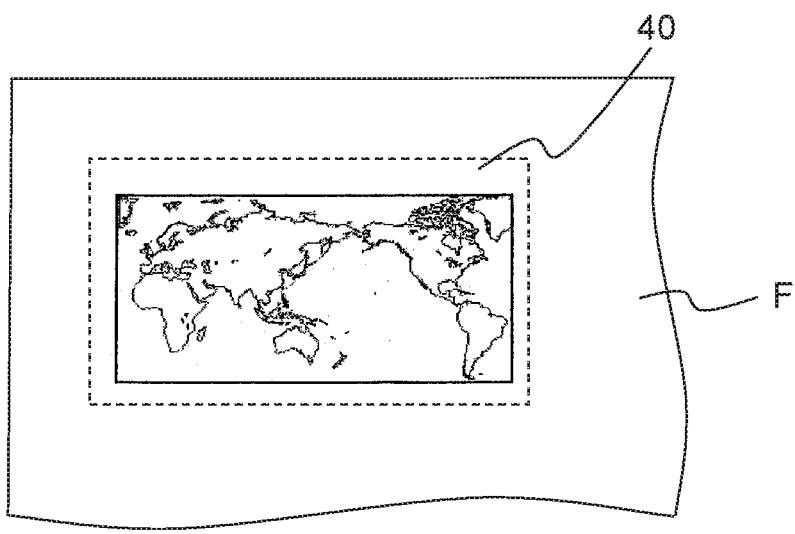
Figure 4:
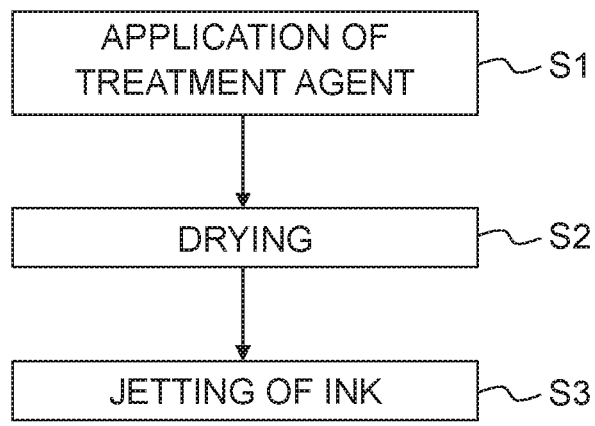
FIG. 4 is a flow chart indicating the recording method of the present teaching.

At first, the treatment agent for image recording is applied to the fabric (step S1 of FIG. 4, the step for applying the treatment agent). The application of the treatment agent for image recording can be performed, for example, by means of a spray system, stamp application, brush application, roller application, dipping (immersion in the treatment agent), the ink-jet system, etc. The treatment agent for image recording may be applied to the entirety (entire surface) or a part of a recording surface (image formation surface) of the fabric. In a case that the treatment agent for image recording is applied to the part of the recording surface, at least a recording portion, of the recording surface of the fabric, in which recording is (to be) performed by using the water-based ink(s) is an application portion for the treatment agent for image recording. In a case that the treatment agent for image recording is applied to the part of the recording surface, the size of the application portion is preferably larger than the recording portion. For example, as depicted in FIG. 3A, in a case that a letter "X" is printed on a fabric F, the treatment agent for image recording is preferably applied so that an application portion 30 is formed to have a line width which is larger than a line width of the letter. Further, as depicted in FIG. 3B, in a case that a pattern is printed on the fabric F, the treatment agent for image recording is preferably applied so that an application portion 40 is formed to be larger than the pattern.

In the application of the treatment agent for image recording, an application amount of the treatment agent for image recording per an area of the fabric is, for example, in a range of 4.7 mg/cm$^2$ (30 mg/inch) to 50 mg/cm$^2$ (320 mg/inch$^2$). By making the application amount to be within this range, the water resistance of the printed matter is further improved.

Next, the treatment agent for image recording applied as described above is dried (step S2 of FIG. 4, the step for drying). By providing the step for drying (by performing the drying), it is possible to suppress any blurring or bleeding in the recorded image, thereby making it possible to further improve the water resistance of the printer matter. A time (timing) for performing the drying of the applied treatment agent is exemplified, for example, by a time (timing) before the image recording, and a time (timing) after the image recording; and the time before the image recording is preferred. The drying may be, for example, air drying (natural drying). Alternatively, the drying may be performed by using any commercially available drying mechanism such as an iron, a hot press machine, a dryer, an oven, a belt conveyer oven, an IR heater, etc. The drying temperature at a time of performing the drying is, for example, in a range of 130° C. to 220° C.; in a case that the fabric is cotton, the drying temperature at the time of performing the drying is preferably in a range of 180° C. to 210° C.; in a case that the fabric is polyester, the drying temperature at the time of performing the drying is preferably in a range of 140° C. to 160° C. The drying temperature may be, for example, either a temperature of the drying atmosphere or a setting temperature of the drying mechanism. The drying time (duration) is, for example, in a range of 30 seconds to 120 seconds.

Figure 2:
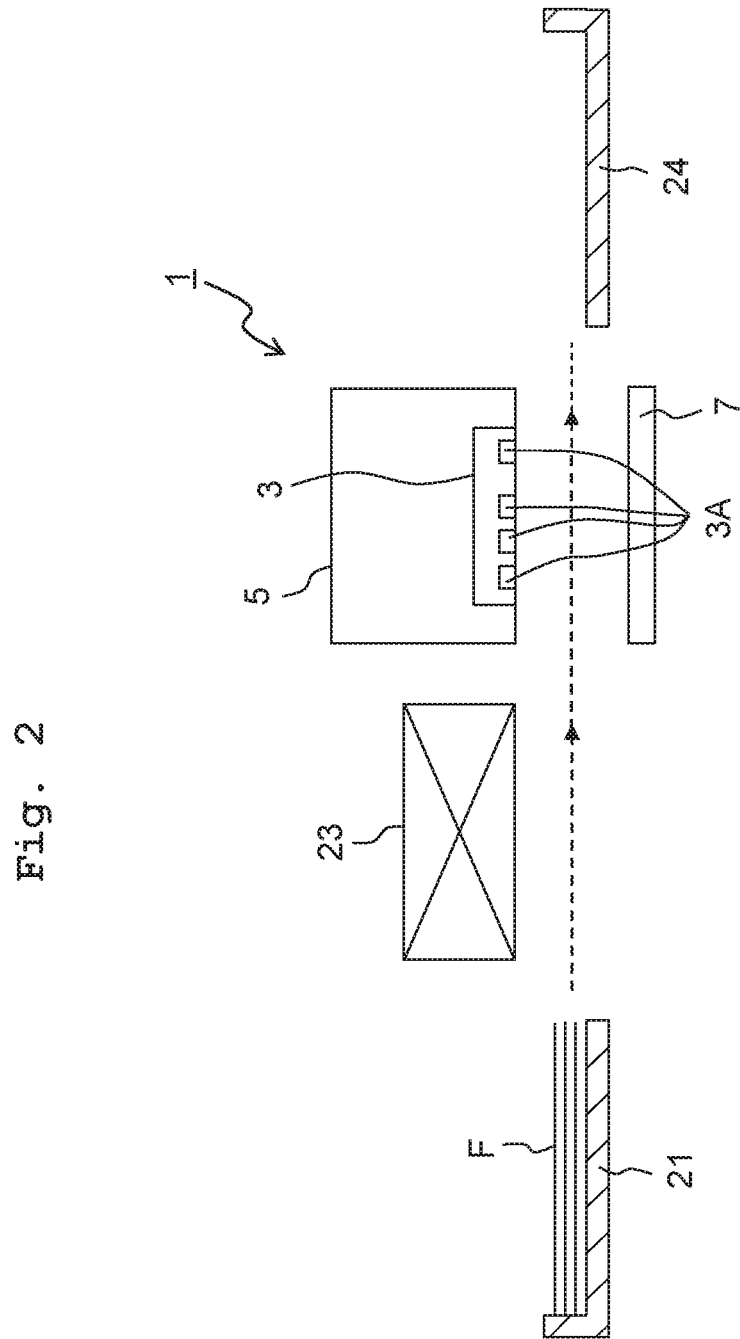
FIG. 2 is a schematic view of an example of the configuration of the ink-jet recording apparatus of the present teaching.

As depicted in FIG. 2, the drying may be performed by using a drying mechanism 23 provided on the ink-jet recording apparatus 1, as depicted in FIG. 1, of the present teaching. Parts or portion in FIG. 2 which are the same as those depicted in FIG. 1 are assigned with the same reference numerals. Note that in FIG. 2, reference numerals 21 and 24 indicate, respectively, a supply tray and a discharge tray of which illustration are omitted in FIG. 1; a reference numeral 3A indicates a plurality of nozzles formed in the lower surface of the ink-jet head 3. Further, the drying of the treatment agent for image recording may be performed at the outside of the ink-jet recording apparatus.

In the drying, it is allowable, for example, that the mass of the applied treatment agent for image recording is reduced to be not more than 50% by mass of the application amount at a time at which the treatment agent for image recording has been applied (application time), or that the mass of the applied treatment agent for image recording is reduced to be not more than 30% by mass of the application amount, of the treatment agent for image recording, at the application time. By making the mass of the treatment agent in the fabric after the drying to be within the above-described range, it is possible to further suppress any blurring or bleeding in the recorded image, thereby making it possible to furthermore improve the water resistance of the printer matter. The drying step may be expressed also as a step for volatilizing a solvent in the treatment agent for image recording (for example, the water, the specific glycol-based solvent, etc.) and/or a step for reducing the mass of the treatment agent for image recording.

Next, the water-based ink is jetted from the ink-jet head 3 onto the fabric to thereby perform recording on the fabric (step S3 of FIG. 4, the step for recording).

In this embodiment, the treatment agent for image recording is used as a pre-treatment agent which is to be applied to the fabric before jetting of the water-based ink. However, the present teaching is not limited to or restricted by this. In the present teaching, it is allowable that the water-based ink is jetted firstly onto the fabric, and then the treatment agent for image recording is applied to the fabric; alternatively, it is allowable that the application of the treatment agent for image recording to the fabric and the jetting of the water-based ink onto the fabric are performed at the same time. From the viewpoint of suppressing the blurring (bleeding) of the recorded image, it is preferred that the application of the treatment agent for image recording, the drying of the treatment agent for image recording, and the jetting of the water-based ink are performed in this order.

In a general recording method for performing recording on a fabric, a thermally fixing step for allowing the water-based ink to be thermally fixed to the fabric is performed after the recording. In the recording method of the present teaching, however, it is optional whether or not to carry out the thermally fixing step; in the recording method of the present teaching, it is allowable that the thermally fixing step is carried out, or is not carried out.

The fabric F having the image formed thereon in such a manner is discharged from the ink-jet recording apparatus 1. According to the present teaching, it is possible to realize an excellent water resistance in the recording on the fabric. Note that in FIG. 1, the supply mechanism and the discharge mechanism for the fabric F are omitted in the illustration of FIG. 1.

The apparatus depicted in FIG. 1 adopts the serial type ink-jet head. However, the present teaching is not limited to or restricted by this. The ink-jet recording apparatus may be an apparatus which adopts a line type ink-jet head.

The recording method of the present teaching may further include performing washing of the fabric with water; the washing may be performed after the recording. By providing a step for washing (by performing the washing), it is possible to further improve the water resistance of the printer matter.

The recording method of the present teaching as described above may be performed by using an ink-jet recording apparatus provided with the treatment agent applying mechanism and/or the drying mechanism, or may be performed by using an ink-jet recording apparatus which is not provided with the treatment-agent applying mechanism and/or the drying mechanism. In a case that the recording method is performed by using the ink-jet recording apparatus which is not provided with the treatment-agent applying mechanism and/or the drying mechanism, it is allowable, for example, that a user applies the treatment agent to the fabric by the spraying method, and/or that the user may dry the treatment agent applied to the fabric with an iron or a dryer.

[Method for Producing Fabric (Fabric Having Image)]

Next, an explanation will be given about a method for producing fabric of the present teaching. The method for producing fabric of the present teaching is a method for producing a fabric having an image, the method including performing recording on the fabric by the recording method of the present teaching.

According to the method for producing fabric of the present teaching, it is possible to obtain a fabric having an excellent water resistance.

[Fabric (Fabric Having Image)]

Next, an explanation will be given about a fabric of the present teaching. The fabric of the present teaching is a fabric having an image, and including a cationic polymer emulsion and the specific glycol-based solvent. The fabric having the image may include: a fabric; a layer (ink-receiving layer) formed in a surface of the fabric and including the cationic polymer and the specific glycol-based solvent; and an image formed, with a colorant, in the layer.

In the fabric having the image of the present teaching, the image has an excellent water resistance.

EXAMPLES

Next, Examples of the present teaching are explained together with Comparative Examples. Note that the present teaching is not limited to or restricted by Examples and Comparative Examples described below.

Examples 1 to 15 and Comparative Examples 1 to 5

Respective components of Treatment Agent Composition (TABLE 2) were mixed uniformly or homogeneously; and thus each of treatment agents for image recording of Examples 1 to 15 and Comparative Examples 1 to 5 was obtained.

With respect to each of the treatment agents for image recording of Examples 1 to 15 and Comparative Examples 1 to 5, (a) Evaluation of the water resistance, (b) Evaluation of the storage stability in a low-temperature storage, and (c) Evaluation of feel by hand were performed by the following methods, respectively. Note that the water-based ink used for each of the evaluations was prepared in the following manner

[Preparation of Water-Based Ink]

<Preparation of Water-Based Dye Ink A>

Respective components of Water-based Ink Composition (TABLE 1) were mixed uniformly or homogeneously; and thus a mixture was obtained. After that, the obtained mixture was filtrated through a polytetrafluoroethylene (PTFE) membrane filter (pore size 0.20 μm) produced by TOYO ROSHI KAISHA, LTD., and thus a water-based dye ink A for ink-jet recording was obtained.

<Preparation of Water-based Pigment Ink B>

Respective components of Water-based Ink Composition (TABLE 1), which were included in Water-based Ink Composition and which were different from CAB-O-JET (trade name) 300, were mixed uniformly or homogeneously; and thus an ink solvent was obtained. Subsequently, the ink solvent was added to CAB-O-JET (trade name) 300, followed by being mixed uniformly, and thus a mixture was obtained. After that, the obtained mixture was filtrated through a cellulose acetate membrane filter (pore size 3.00 μm) produced by TOYO ROSHI KAISHA, LTD., and thus a water-based pigment ink B for ink-jet recording indicated in TABLE 1 was obtained.

TABLE 1 (following)—LEGEND

*1: Self-dispersible carbon black; produced by CABOT CORPORATION; numerical value in TABLE 1 indicates the solid content amount.

*2: Nonionic surfactant produced by NISSAN CHEMICAL INDUSTRIES, LTD.; numerical values in TABLE 1 indicate active ingredient amounts.

*3: Anionic surfactant produced by LION SPECIALTY CHEMICALS CO., LTD.; active ingredient amount: 28% by mass; numerical values in TABLE 1 indicate active ingredient amounts.

The unit of the ink composition is % by mass.

TABLE 1

|  |  |  | INKS | |
|---|---|---|---|---|
|  |  |  | A | B |
| Ink Composition (% by mass) | Colorant | C.I. Direct Blue 199 | 4.00 | — |
|  |  | CAB-O-JET (trade name) 300 (*1) | — | 4.00 |
|  | Humectant | Glycerol | 20.00 | 20.00 |
|  | Surfactant | OLFIN (trade name) E1010 (*2) | 0.20 | 0.20 |
|  |  | SUNNOL (trade name) NL1430 (*3) | 0.20 | 0.20 |
|  |  | Water | balance | balance |

(a) Evaluation of Water Resistance

Approximately 1 g of the treatment agent for image recording of each of Examples 1 to 14 and Comparative Examples 1 to 5 was uniformly applied, by the spraying method, to a fabric (cotton (sheeting)) having a plane size of 15 cm×5 cm. Subsequently, the fabric after having the treatment agent for image recording applied thereto was dried for 2 minutes by using an iron set to a high temperature (in a range of 180° C. to 210° C.) of which upper limit temperature was 210° C. Next, after the fabric was dried, recording was performed on the fabric by using the water-based ink A or B indicated in TABLE 1 and by using an ink-jet printer-equipped digital multifunction machine DCP-J4225N produced by BROTHER INDUSTRIES, LTD. The fabric after having the recording performed thereon was washed with water for 5 minutes while shaking the fabric in the water to such an extent that a part of the fabric F was not rubbed with another part of the fabric F. The optical density (OD value) of a recording portion of a recording surface of the fabric obtained by being dried after the washing with water was measured by using a spectrophotometer Spectro Eye produced by X-RITE (light source: $D_{50}$, field angle: 2°, ANSI-T) to thereby calculate the difference (ΔOD) in the optical density (OD value) of the fabric before and after the washing with water (ΔOD=OD value after washing with water−OD value before washing with water), and the evaluation of the water resistance was performed therefor in accordance with the following criterion for evaluation. Note that in Example 15, the water resistance was evaluated in a similar manner as in Examples 1 to 14 and Comparative Examples 1 to 5, except that polyester (twill) was used as the fabric, and that the temperature of the iron was set to a medium temperature (in a range of 140° C. to 160° C.) of which upper limit temperature was 160° C.

<Criterion for Evaluation of Water Resistance>

AA: The ΔOD exceeded −0.04.

A: The ΔOD was in a range of not less than −0.06 to not more than −0.04.

B: The ΔOD was in a range of not less than −0.10 to less than −0.06.

C: The ΔOD was less than −0.10.

(b) Evaluation of Storage Stability in Low-temperature Storage

The treatment agent for image recording of each of Examples 1 to 15 and Comparative Examples 1 to 5 was stored for three days at each of temperature of −5° C., −10° C. and −20° C., the treatment agent for image recording was observed by using a microscope (magnification: ×200), and the evaluation of the storage stability in a low-temperature storage was performed therefor in accordance with the following criterion for evaluation.

<Criterion for Evaluation of Storage Stability in Low-Temperature Storage>

AA: Any foreign matter was not observed even after storage at −20° C.

A: Although any foreign matter was not observed after storage at −10° C., a foreign body was observed after storage at −20° C.

B: Although any foreign matter was not observed after storage at −5° C., a foreign body was observed after storage at −10° C.

C: A foreign body was observed after storage at −5° C.

(c) Evaluation of Feel by Hand

Ten testees touched, with fingers, a fabric produced in a similar manner as in the (a) Evaluation of Water Resistance and before being washed by water, and the original cotton for which the application of the treatment agent for image recording and the recording with the water-based ink were not performed (in Example 15, the original polyester for which the application of the treatment agent for image recording and the recording with the water-based ink were not performed). The number of those, among the ten testees, who felt that the feel by hand of the fabric became hardened, as compared with the original cotton (in Example 15, the original polyester) was totaled, and evaluation was performed therefor in accordance with the following criterion for evaluation. Note that regarding Examples 1 and 10, in (a) Evaluation of Water Resistance, two kinds of evaluation samples which were an evaluation sample using the water-based dye ink A and an evaluation sample using the water-based pigment ink B were used; in this (c) Evaluation of Feel by Hand, only the valuation sample using the water-based dye ink A was used.

<Evaluation Criterion for Evaluation of Feel by Hand>

AA: Not more than 1 testee among the ten testees felt that the feel by hand of the fabric became hardened.

A: Two to four testees among the ten testees felt that the feel by hand of the fabric became hardened.

B: Not less than 5 testees among the ten testees felt that the feel by hand of the fabric became hardened.

TABLE 2 indicates the configuration of the treatment agent for image recording of each of Examples 1 to 15 and Comparative Examples 1 to 5, and the evaluation results for the treatment agent for image recording of each of Examples 1 to 15 and Comparative Examples 1 to 5.

TABLE 2 (following)—LEGEND

*4: Cationic urethane acrylic emulsion (including the ester-based urethane structure); produced by JAPAN COATING RESIN CO., LTD.; numerical values in TABLE 2 indicate solid content amounts.

*5: Cationic urethane acrylic emulsion; produced by DAI-ICHI KOGYO SEIYAKU CO., LTD; numerical values in TABLE 2 indicate solid content amounts.

*6: Cationic styrene acrylic emulsion; produced by JAPAN COATING RESIN CO., LTD.; numerical values in TABLE 2 indicate solid content amounts.

*7: Numerical values in TABLE 2 indicate solid content amounts.

*2: Nonionic surfactant produced by NISSAN CHEMICAL INDUSTRIES, LTD.; numerical values in TABLE 2 indicate active ingredient amounts.

TABLE 2

| | | | EXAMPLES | | | | | | | | | |
|---|---|---|---|---|---|---|---|---|---|---|---|---|
| | | | 1 | 2 | 3 | 4 | 5 | 6 | 7 | 8 | 9 | 10 |
| Treatment Agent Composition (% by mass) | Cationic polymer emulsion (B) | MOWINYL (trade name) 6910 (*4) | 2.00 | 2.50 | 4.00 | 10.00 | 20.00 | 25.00 | 4.00 | 4.00 | 4.00 | 4.00 |
| | | SUPERFLEX (trade name) 650 (*5) | — | — | — | — | — | — | — | — | — | — |
| | | MOWINYL (trade name) 6901 (*6) | — | — | — | — | — | — | — | — | — | — |
| | Anionic urethane acrylic emulsion (*7) | | — | — | — | — | — | — | — | — | — | — |

TABLE 2-continued

| | | | | | | | | | | | | |
|---|---|---|---|---|---|---|---|---|---|---|---|---|
| | Specific glycol-based solvent | Propylene glycol (A) | 40.00 | 40.00 | 40.00 | 40.00 | 40.00 | 40.00 | 20.00 | 24.00 | 35.00 | 50.00 |
| | | Glycerol | — | — | — | — | — | — | — | — | — | — |
| | Surfactant | OLFINE (trade name) E1010 (*2) | 1.00 | 1.00 | 1.00 | 1.00 | 1.00 | 1.00 | 1.00 | 1.00 | 1.00 | 1.00 |
| | | Water (C) | 57.00 | 56.50 | 55.00 | 49.00 | 39.00 | 34.00 | 75.00 | 71.00 | 60.00 | 45.00 |
| | B/A | | 0.050 | 0.063 | 0.100 | 0.250 | 0.500 | 0.625 | 0.200 | 0.167 | 0.114 | 0.080 |
| | A/C | | 0.702 | 0.708 | 0.727 | 0.816 | 1.026 | 1.176 | 0.267 | 0.338 | 0.583 | 1.111 |
| Evaluation | Water resistance | Water-based dye ink A | B | A | AA | AA | AA | AA | AA | AA | AA | AA |
| | | Water-based pigment ink B | B | — | — | — | — | — | — | — | — | AA |
| | Storage stability in low-temperature storage | | AA | AA | AA | AA | AA | AA | B | A | AA | AA |
| | Feel by hand | | AA | AA | AA | AA | A | B | AA | AA | AA | AA |

| | | | EXAMPLES | | | | | COMPARATIVE EXAMPLES | | | | |
|---|---|---|---|---|---|---|---|---|---|---|---|---|
| | | | 11 | 12 | 13 | 14 | 15 | 1 | 2 | 3 | 4 | 5 |
| Treatment Agent Composition (% by mass) | Cationic polymer emulsion (B) | MOWINYL (trade name) 6910 (*4) | 4.00 | 4.00 | — | — | 10.00 | 4.00 | 4.00 | 4.00 | 4.00 | — |
| | | SUPERFLEX (trade name) 650 (*5) | — | — | 10.00 | — | — | — | — | — | — | — |
| | | MOWINYL (trade name) 6901 (*6) | — | — | — | 10.00 | — | — | — | — | — | — |
| | | Anionic urethane acrylic emulsion (*7) | — | — | — | — | — | — | — | — | — | 10.00 |
| | Specific glycol-based solvent | Propylene glycol (A) | 55.00 | 60.00 | 40.00 | 40.00 | 40.00 | — | — | 15.00 | 65.00 | 40.00 |
| | | Glycerol | — | — | — | — | — | 20.00 | 40.00 | — | — | — |
| | Surfactant | OLFINE (trade name) E1010 (*2) | 1.00 | 1.00 | 1.00 | 1.00 | 1.00 | 1.00 | 1.00 | 1.00 | 1.00 | 1.00 |
| | | Water (C) | 40.00 | 35.00 | 49.00 | 49.00 | 49.00 | 75.00 | 55.00 | 80.00 | 30.00 | 49.00 |
| | B/A | | 0.073 | 0.067 | 0.250 | 0.250 | 0.250 | — | — | 0.267 | 0.062 | 0 |
| | A/C | | 1.375 | 1.714 | 0.816 | 0.816 | 0.816 | — | — | 0.188 | 2.167 | 0.816 |
| Evaluation | Water resistance | Water-based dye ink A | A | A | AA | A | A | B | C | AA | C | C |
| | | Water-based pigment ink B | — | — | — | — | — | — | — | — | — | — |
| | Storage stability in low-temperature storage | | AA | AA | AA | AA | AA | C | A | C | AA | AA |
| | Feel by hand | | AA | AA | A | B | AA | AA | AA | AA | AA | AA |

As indicated in TABLE 2, the results in the evaluation of the water resistance, the evaluation of storage stability in low-temperature storage and the evaluation of feel by hand were all satisfactory in each of Examples 1 to 15. Comparison will be made regarding Examples 1 to 12 using the same cationic polymer emulsion. In Examples 2 to 12 in each of which B≥2.5, the results of the evaluation of water resistance in cotton were more excellent as compared with that in Example 1 in which B<2.5. In Examples 1 to 5 and 7 to 12 in each of which B≤20, the results of the evaluation of feel by hand in cotton were more excellent as compared with that in Example 6 in which B>20. In Examples 1 to 6 and 8 to 12 in each of which A/C≥0.33, the results of the evaluation of storage stability in low-temperature storage were more excellent as compared with that in Example 7 in which A/C<0.33; and in Examples 1 to 6 and 9 to 12 in each of which A/C≥0.58, the results of the evaluation of storage stability in low-temperature storage were more excellent as compared with that in Example 8 in which A/C<0.58. In Examples 3 to 10 in each of which B/A≥0.08, the results of the evaluation of water resistance in cotton were more excellent as compared with those in Examples 1, 2, 11 and 12 in each of which B/A<0.08.

Comparison will be made regarding Examples 4, 13 and 14 which were different from one another in the kind of the cationic polymer emulsion and which had same condition except for the above. In Examples 4 and 13 in each of which the cationic polymer emulsion contained the urethane structure, the results of the evaluation of feel by hand in cotton were more excellent as compared with that in Example 14 in which the cationic polymer emulsion did not contain the urethane structure. In Example 4 in which the urethane structure of the cationic polymer emulsion was ester-based, the result of the evaluation of feel by hand in cotton was more excellent as compared with that in Example 13 in which the urethane structure of the cationic polymer emulsion was not ester-based.

On the other hand, in Comparative Examples 1 and 2 each using the glycerol of which boiling point exceeded 200° C. (boiling point: 290° C.) instead of using the specific glycol-based solvent, the result of the evaluation of storage stability in low-temperature storage, or the result of the evaluation of water resistance in cotton were unsatisfactory. Further, in Comparative Example 3 in which A<20, the result of the evaluation of storage stability in low-temperature storage was unsatisfactory; and in Comparative Example 4 in which A>60, the result of the evaluation of water resistance in cotton was unsatisfactory. Further, Comparative Example 5 which used the anionic polymer emulsion instead of using the cationic polymer emulsion, the result of the water resistance in cotton was unsatisfactory.

As described above, the treatment agent for image recording of the present teaching is excellent in the water resistance in the recording on fabric and in the storage stability in the low-temperature storage. Further, way of use or application of the treatment agent for image recording of the present teaching is not particularly limited; the treatment agent for image recording of the present teaching is applicable widely to the image formation on a variety of kinds of fabric and on a recording medium which is different from the fabric, such as recording paper (recording sheet, recording paper sheet), etc.

What is claimed is:

1. A treatment agent for image recording comprising:
   a cationic polymer emulsion; and
   a water-soluble organic solvent including a glycol-based water-soluble organic solvent of which boiling point is not more than 200° C.,
   the treatment agent satisfying the following conditions (1) and (5):

$$20 \leq A \leq 60 \quad (1)$$

$$0.08 \leq B/A \leq 0.9 \quad (5)$$

wherein in the conditions (1) and (5),
   A: a content amount (% by mass) of the glycol-based water-soluble organic solvent, of which boiling point is not more than 200° C., in an entire amount of the treatment agent for image recording, and
   B: a solid content amount (% by mass) of the cationic polymer emulsion in the entire amount of the treatment agent for image recording.

2. The treatment agent for image recording according to claim 1, further satisfying the following condition (2):

$$2.5 \leq B \leq 20 \quad (2)$$

wherein in the condition (2),
   B: a solid content amount (% by mass) of the cationic polymer emulsion in the entire amount of the treatment agent for image recording.

3. The treatment agent for image recording according to claim 1, further comprising water,
   wherein the treatment agent satisfies the following condition (3):

$$A/C \geq 0.33 \quad (3)$$

in the condition (3),
   A: the content amount (% by mass) of the glycol-based water-soluble organic solvent, of which boiling point is not more than 200° C., in the entire amount of the treatment agent for image recording, and
   C: a content amount (% by mass) of the water in the entire amount of the treatment agent for image recording.

4. The treatment agent for image recording according to claim 3, further satisfying the following condition (4):

$$A/C \geq 0.58 \quad (4)$$

wherein in the condition (4),
   A: the content amount (% by mass) of the glycol-based water-soluble organic solvent, of which boiling point is not more than 200° C., in the entire amount of the treatment agent for image recording, and
   C: the content amount (% by mass) of the water in the entire amount of the treatment agent for image recording.

5. The treatment agent for image recording according to claim 1, wherein a cationic polymer included in the cationic polymer emulsion includes a urethane structure.

6. The treatment agent for image recording according to claim 5, wherein the cationic polymer included in the cationic polymer emulsion includes at least one of an acrylic structure and a styrene structure.

7. The treatment agent for image recording according to claim 1, wherein a cationic polymer included in the cationic polymer emulsion includes an ester-based urethane structure.

8. The treatment agent for image recording according to claim 1, wherein the glycol-based water-soluble organic solvent, of which boiling point is not more than 200° C., is at least one selected from the group consisting of: ethylene glycol, propylene glycol, 1,2-butanediol and 2,3-butanediol.

9. The treatment agent for image recording according to claim 1, wherein the glycol-based water-soluble organic solvent, of which boiling point is not more than 200° C., is propylene glycol.

10. The treatment agent for image recording according to claim 1, further comprising at least one of a nonionic surfactant and a cationic surfactant,
    wherein a content amount of the at least one of the nonionic surfactant and the cationic surfactant in the entire amount of the treatment agent for image recording is in a range of 0.2% by mass and 5% by mass.

11. The treatment agent for image recording according to claim 1, which is usable for recording on a fabric.

12. The treatment agent for image recording according to claim 1, wherein the water-soluble organic solvent consists essentially of the glycol-based water-soluble organic solvent of which boiling point is not more than 200° C.

13. The treatment agent for image recording according to claim 1, wherein the cationic polymer emulsion includes a dispersion medium and particles of a cationic polymer dispersed in the dispersion medium.

14. A set usable for recording on a fabric, the set comprising:
    a water-based ink for ink-jet recording including a colorant and water; and
    the treatment agent for image recording as defined in claim 1.

15. A recording method for recording on a fabric by using the set as defined in claim 14, the recording method comprising:
    applying the treatment agent for image recording to the fabric;
    drying the treatment agent for image recording applied to the fabric; and
    jetting of the water-based ink onto the fabric by an ink-jet system.

16. The recording method according to claim 15, wherein a drying temperature in the drying of the treatment agent for image recording applied to the fabric is in a range of 130° C. to 220° C.

17. The recording method according to claim 15, wherein in the applying the treatment agent for image recording to the fabric, an application amount, per an area of the fabric, of the treatment agent for image recording is in a range of 4.7 mg/cm² to 50 mg/cm².

18. The recording method according to claim 15, wherein in the drying of the treatment agent for image recording applied to the fabric, mass of the treatment agent for image recording in the fabric is reduced to be not more than 50% by mass of an application amount of the treatment agent for image recording.

19. The recording method according to claim 18, wherein in the drying of the treatment agent for image recording applied to the fabric, the mass of the treatment agent for image recording in the fabric is reduced to be not more than 30% by mass of the application amount of the treatment agent for image recording.

* * * * *